US012481443B2

(12) United States Patent
Dasan et al.

(10) Patent No.: US 12,481,443 B2
(45) Date of Patent: Nov. 25, 2025

(54) LOAD MANAGER

(71) Applicant: Dell Products L.P., Round Rock, TX (US)

(72) Inventors: Hemanth Dasan, Bangalore (IN); Mahadev Agasar, Rabkavi (IN)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 18/159,841

(22) Filed: Jan. 26, 2023

(65) Prior Publication Data
US 2024/0256161 A1 Aug. 1, 2024

(51) Int. Cl.
G06F 3/06 (2006.01)

(52) U.S. Cl.
CPC .......... *G06F 3/0635* (2013.01); *G06F 3/0614* (2013.01); *G06F 3/067* (2013.01)

(58) Field of Classification Search
CPC ...... G06F 3/0604; G06F 3/0605; G06F 3/061; G06F 3/0611; G06F 3/0613; G06F 3/0614; G06F 3/0635; G06F 3/067; H04L 67/1004; H04L 67/1006; H04L 67/1036
USPC ....... 707/827; 710/38, 74; 711/154; 718/105
See application file for complete search history.

(56) References Cited

U.S. PATENT DOCUMENTS

| | | | | |
|---|---|---|---|---|
| 11,042,512 B1* | 6/2021 | Bono | ............... | G06F 11/1464 |
| 11,341,445 B1* | 5/2022 | Cheng | ............... | G06Q 10/0633 |
| 2002/0147797 A1* | 10/2002 | Paul | ............... | H04L 41/0809 |
| | | | | 709/220 |
| 2008/0244172 A1* | 10/2008 | Kano | ............... | G06F 11/2069 |
| | | | | 711/112 |
| 2013/0055092 A1* | 2/2013 | Cannon, III | ............... | G06F 3/0484 |
| | | | | 715/738 |
| 2022/0342598 A1* | 10/2022 | Dar | ............... | G06F 3/067 |
| 2023/0403202 A1* | 12/2023 | Hall | ............... | G06F 3/04817 |

* cited by examiner

*Primary Examiner* — Eric T Oberly
(74) *Attorney, Agent, or Firm* — Daly, Crowley, Mofford & Durkee, LLP

(57) ABSTRACT

A method for use in a storage system, the method including: executing a plurality of NAS facilities, each of the NAS facilities being implemented as a separate containerized application, each of the NAS facilities being executed inside a respective one of a plurality of master containers, each of the NAS facilities executing a different one of a plurality of file systems, each of the NAS facilities being configured to read and write data to one or more physical storage locations; detecting a user input selecting a load-balancing action; and executing the load-balancing action in response to the user input, wherein executing the load-balancing action includes at least one of: (i) relocating a given one of the plurality of NAS facilities from a first master container to a second master container, and (ii) changing an assignment of ports to the given one of the plurality of NAS facilities.

14 Claims, 11 Drawing Sheets

LOAD MANAGER

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, the method comprising: executing a plurality of NAS facilities, each of the NAS facilities being implemented as a separate containerized application, each of the NAS facilities being executed inside a respective one of a plurality of master containers, each of the NAS facilities executing a different one of a plurality of file systems, each of the NAS facilities being configured to read and write data to one or more physical storage locations; detecting a user input selecting a load-balancing action; and executing the load-balancing action in response to the user input, wherein executing the load-balancing action includes at least one of: (i) relocating a given one of the plurality of NAS facilities from a first master container to a second master container, and (ii) changing an assignment of ports to the given one of the plurality of NAS facilities.

According to aspects of the disclosure, a system is provided, comprising: a memory; and processing circuitry operatively coupled to the memory, the processing circuitry being configured to perform the operations of: executing a plurality of NAS facilities, each of the NAS facilities being implemented as a separate containerized application, each of the NAS facilities being executed inside a respective one of a plurality of master containers, each of the NAS facilities executing a different one of a plurality of file systems, each of the NAS facilities being configured to read and write data to one or more physical storage locations; detecting a user input selecting a load-balancing action; and executing the load-balancing action in response to the user input, wherein executing the load-balancing action includes at least one of: (i) relocating a given one of the plurality of NAS facilities from a first master container to a second master container, and (ii) changing an assignment of ports to the given one of the plurality of NAS facilities.

According to aspects of the disclosure, a non-transitory computer-readable medium storing processor-executable instructions, which, when executed by processing circuitry, cause the processing circuitry to perform the operations of: executing a plurality of NAS facilities, each of the NAS facilities being implemented as a separate containerized application, each of the NAS facilities being executed inside a respective one of a plurality of master containers, each of the NAS facilities executing a different one of a plurality of file systems, each of the NAS facilities being configured to read and write data to one or more physical storage locations; detecting a user input selecting a load-balancing action; and executing the load-balancing action in response to the user input, wherein executing the load-balancing action includes at least one of: (i) relocating a given one of the plurality of NAS facilities from a first master container to a second master container, and (ii) changing an assignment of ports to the given one of the plurality of NAS facilities.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Storage systems, such as DELL/EMC Powermax™ and PowerStore™ use Software Defined Network Attached Storage (SDNAS) to provide Network-Attached Storage (NAS) functionality. As per the current architecture of SDNAS, a minimum of 2-master-container (or 2-node) configuration is supported. Each master container (or node) may expose a minimum of two physical ports to enable access to filesystem data by NAS facilities that are executed within the master container. The load on different master containers may vary according to the total workload that is placed on NAS facilities running within the container. The present disclosure provides examples of various techniques for balancing the load on master containers to achieve a faster and more efficient operation of the master containers.

Figure 1:
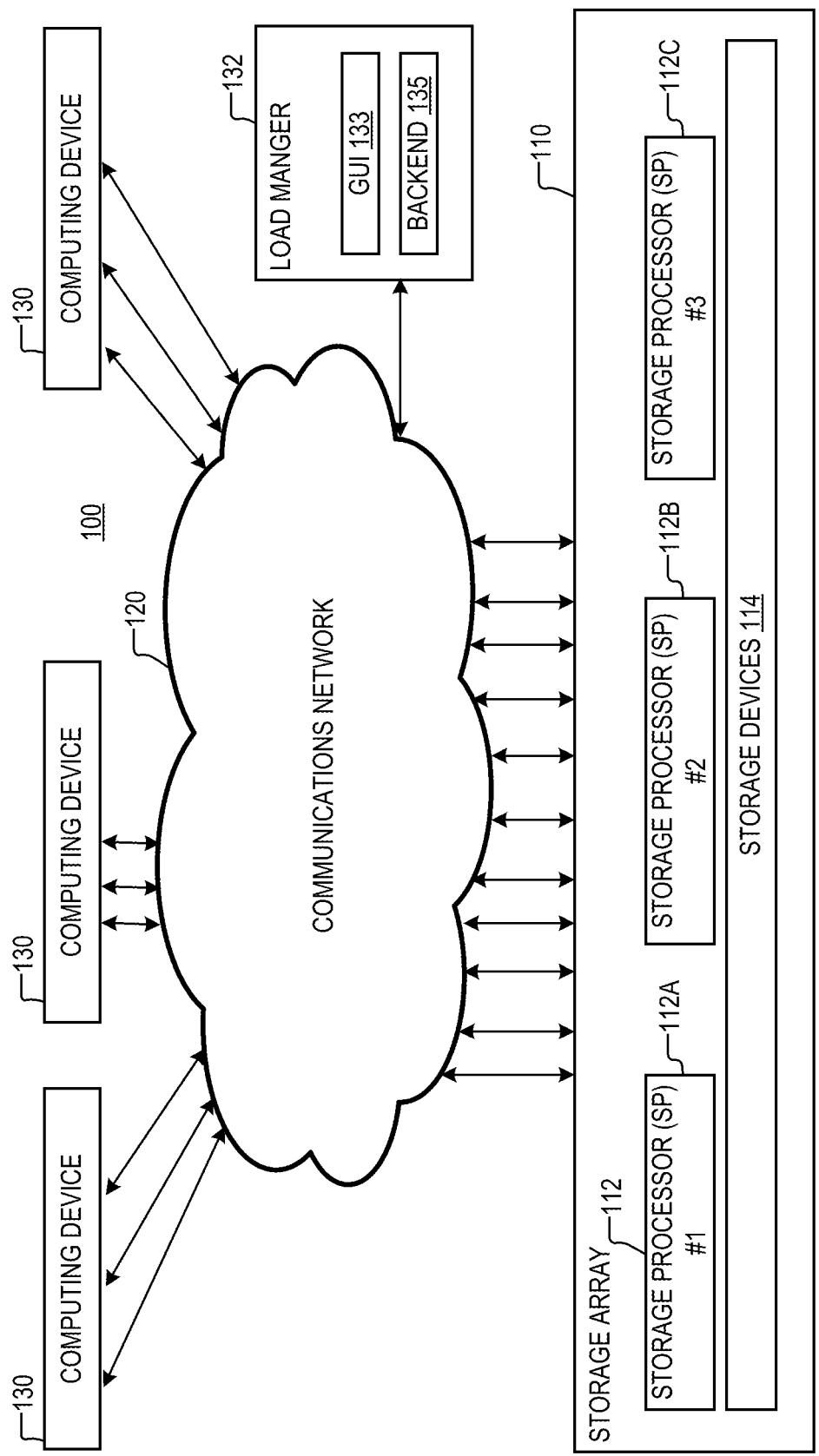
FIG. 1 is a diagram of an example of a system, according to aspects of the disclosure.

FIG. 1 is a diagram of an example of a system 100, according to aspects of the disclosure. As illustrated, the system 100 may include a storage array 110, a communications network 120, a plurality of computing devices 130, and a load manager 132. The storage array 110 may include a storage system, such as DELL/EMC Powermax™, DELL PowerStore™, and/or any other suitable type of storage system. The storage array 110 may include a plurality of storage processors 112A-C and a plurality of storage devices 114. Each of the storage processors 112A-C may include a computing device, such as the computing device 1100, which is discussed further below with respect to FIG. 11. Each of the storage processors 112A-C may be configured to receive I/O requests from computing devices 130 and execute the received I/O requests by reading and/or writing data from the storage devices 114. Each of the storage devices 114 may include one or more of a solid-state drive (SSD), a hard disk (HD), a non-volatile random-access memory (NVRam) device, a non-volatile memory express (NVMe) device, and/or any other suitable type of storage device.

Each computing device 130 may include a laptop computer, a desktop computer, an Internet-of-things (IoT) device, and/or any other suitable type of computing device that might read or write data to the storage array 110. The load manager 132 may include a computing device, such as the computing device 1100, which is discussed further below with respect to FIG. 11. The load manager 132 may be configured to execute a graphical user interface (GUI) 133 and a backend 135. The GUI 133 may be arranged to receive user input for load-balancing the master containers in one or more of the storage processors 112A-C. The backend 135 may execute one or more load-balancing algorithms for balancing the load on the master containers. The load-balancing algorithms may be executed based on user input that is received via the GUI 133. According to the present example, the backend 135 is implemented in software. However, alternative implementations are possible in which the backend 135 is implemented in hardware or as a combination of hardware and software.

The storage array 110, computing devices 130, and load manager 132 may be coupled to one another via the communications network 120. The communications network 120 may include one or more of a fibre channel (FC) network, the Internet, a local area network (LAN), a wide area network (WAN), and/or any other suitable type of network.

Figure 2:
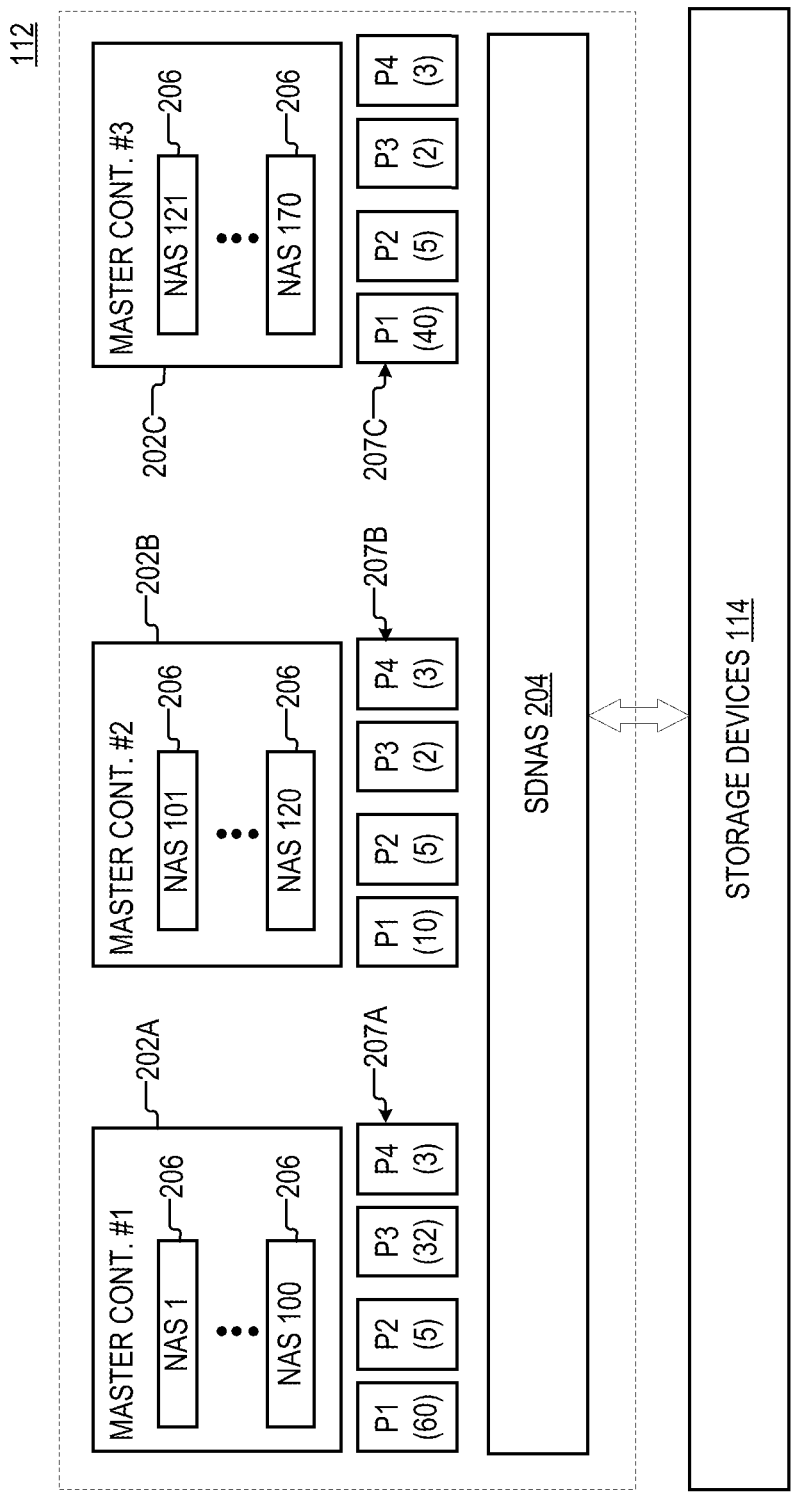
FIG. 2 is a diagram illustrating aspects of the operation of the system of FIG. 1, according to aspects of the disclosure.

FIG. 2 is a diagram of a software environment that is executed on a storage processor 112A, according to aspects of the disclosure. In the example of FIG. 2, the storage processor 112A is provided with ports P1-P4 and configured to execute master containers 202A-C. The master containers 202A-C are executed by using an SDNAS layer 204.

Each of the master containers 202A-C may be configured to execute a plurality of NAS facilities 206. Each of the NAS facilities 206 may be assigned at least one of the ports P1-P4. Although in the example of FIG. 1, each of the NAS facilities 206 is assigned only one of the ports P1-P4, alternative implementations are possible in which each of the NAS facilities 206 is assigned more than one port (e.g., two of the ports P1-P4, etc.). Specifically, in a preferred implementation, each of the NAS facilities may be assigned two ports. Although in the example of FIG. 2 the storage processor 112A is configured to execute 3 master containers, alternative implementations are possible in which the storage processor 112A is configured to execute a different number of master containers. For example, in DELL/EMC Powermax™ storage systems, the storage processors normally include 8 containers. In other words, in a preferred implementation, each of the NAS facilities may be assigned two ports.

The SDNAS layer 204 may be configured to provide file systems, snapshot generation services, naming services, such as Domain Name Service (DNS), Lightweight Directory Access Protocol (LDAP), Network Information Service (NIS), etc. Furthermore, the SDNAS layer 204 may provide a communication protocol stack and/or one or more network protocols, such as Samba (SMB), File Transfer Protocol (FTP), Network File System (NFS), or Secure FTP (SFTP). In some implementations, the SDNAS layer may include an embedded software-defined network-accessible storage (NAS) solution offering reliable, highly available, scale-out, high-performance, 64-bit file system facility. Although in the example of FIG. 2 the SDNAS layer 204 is depicted as being separate from the master containers 202A-C, it will be understood that in some implementations the SDNAS may be implemented as a plurality of different SDNAS instances, where each SDNAS instance is executed inside a respective master container 202A-C to provide the above-listed services to that master container as well as NAS facilities that are executed by the master container.

Each of the master containers 202A-C may provide a runtime for the NAS facilities 206. Each of the master containers 202A-C may encapsulate the NAS facilities 206 that are executed within the master container, and provide various system libraries, binaries, and configuration files that are necessary for the execution of the application. Each of the NAS facilities 206 may be a virtual container that hosts one or more file system objects (or file systems). Each of the NAS facilities 206 may be configured to receive filesystem read or write requests (as well as other filesystem requests), and execute the received requests by reading, writing, deleting, or otherwise moving data on the storage devices 114. Any of the received requests may be executed by invoking respective API methods that are provided by the file system/ other file object that is associated with the request.

In the example of FIG. 2, the load on the master nodes 202A-C is unbalanced. For example, master container 202A is configured to execute 100 NAS facilities 206, master container 202B is configured to execute 20 NAS facilities 206, and master container 202C is configured to execute 50 NAS facilities. Furthermore, in the example of FIG. 2, the load on ports P1-P4 is unbalanced. As illustrated by indicators 207A-C, port P1 is mapped to 60 of the NAS facilities 206 in master container 202A, 10 of the NAS facilities 206 in master container 2, and 40 of the NAS facilities 206 in master container 202C, for a total of 100 NAS facilities. Port P2 is mapped to 5 of the NAS facilities in master container 202A, 5 of the NAS facilities in master container 202B, and 5 of the NAS facilities in master container 202C, for a total of 15 NAS facilities. Port P3 is mapped to 32 of the NAS facilities in master container 202A, 2 of the NAS facilities in master container 202B, and 2 of the NAS facilities in master container 202C, for a total of 36 NAS facilities. And port P4 is mapped to 3 of the NAS facilities in master container 202A, 3 of the NAS facilities in master container 202B, and 3 of the NAS facilities in master container 202C, for a total of 9 NAS facilities.

Figure 3:
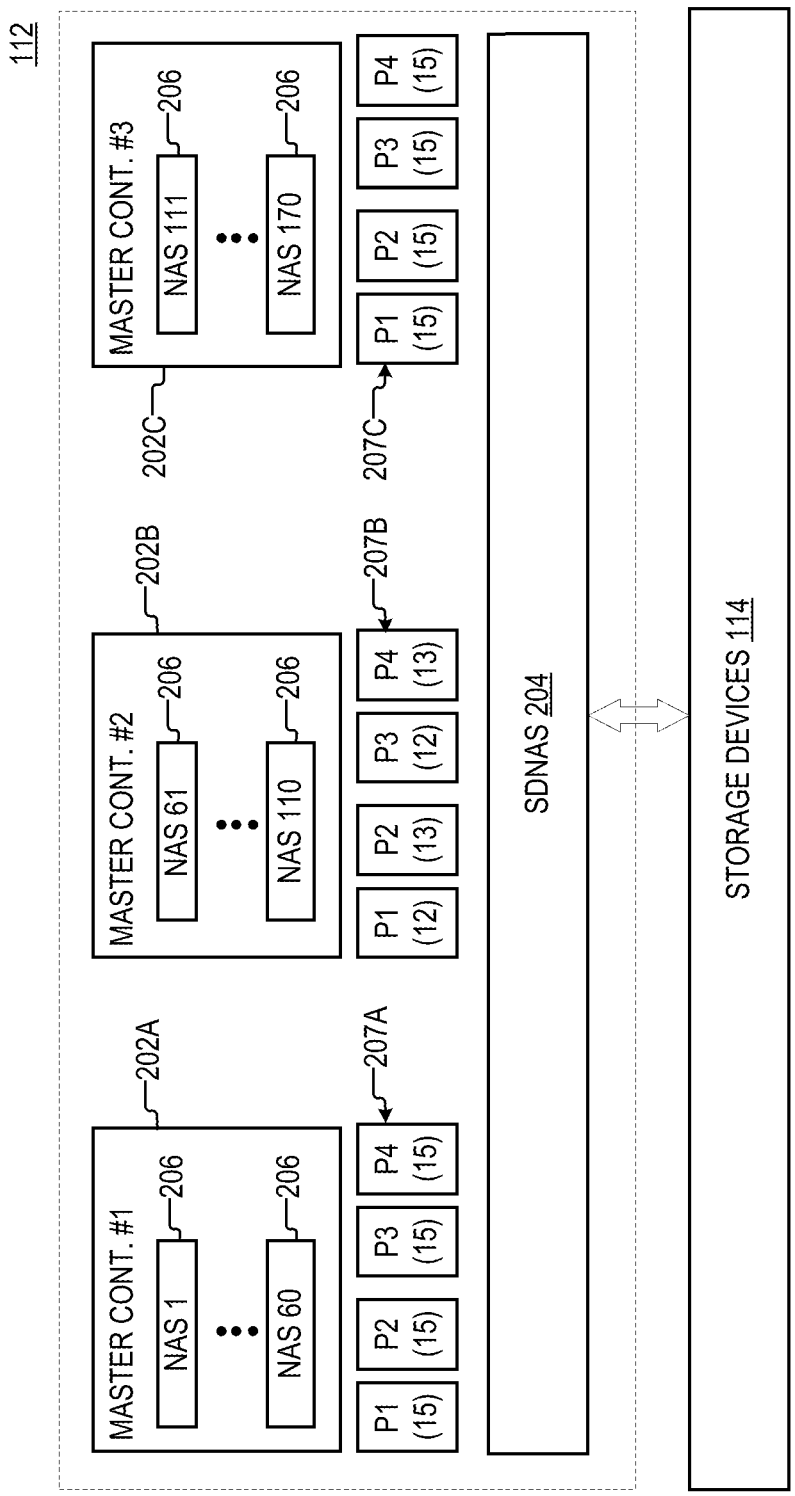
FIG. 3 is a diagram illustrating aspects of the operation of the system of FIG. 1, according to aspects of the disclosure.

FIG. 3 is a diagram of the software environment that is executed on a storage processor 112A, according to aspects of the disclosure. In the example of FIG. 3, the load on master containers 202A-C is balanced. Specifically, master container 202A is configured to execute 60 NAS facilities 206, master container 202B is configured to execute 50 NAS facilities 206, and master container 202C is configured to execute 60 NAS facilities 206. In addition, in the example of FIG. 3, the load on ports P1-P4 is balanced. Specifically, port P1 is mapped to 15 NAS facilities in master container 202A, 12 NAS facilities in master container 202B, and 15 NAS facilities in master container 202C, for a total of 42 NAS facilities. Port P2 is mapped to 15 NAS facilities in master container 202A, 13 NAS facilities in master container 202B, and 15 NAS facilities in master container 202C, for a total of 43 NAS facilities. Port P3 is mapped to 15 NAS facilities in master container 202A, 12 NAS facilities in master container 202B, and 15 NAS facilities in master container 202C, for a total of 42 NAS facilities. And port P4 is mapped to 15 NAS facilities in master container 202A, 13 NAS facilities in master container 202B, and 15 NAS facilities in master container 202C, for a total of 43 NAS facilities. In some respects, FIG. 3 is provided to illustrate that a storage processor 112A may be load-balanced by either re-distributing the NAS facilities 206 more evenly among the master containers 202A-C and/or by assigning a more equal number of NAS facilities to each of the ports P1-P4. Although FIGS. 2-3 shows an example of the software environment of storage processor 112A, it will be understood that in some implementations, storage processors 112B-C may be configured in the same or similar manner.

Figure 4A:
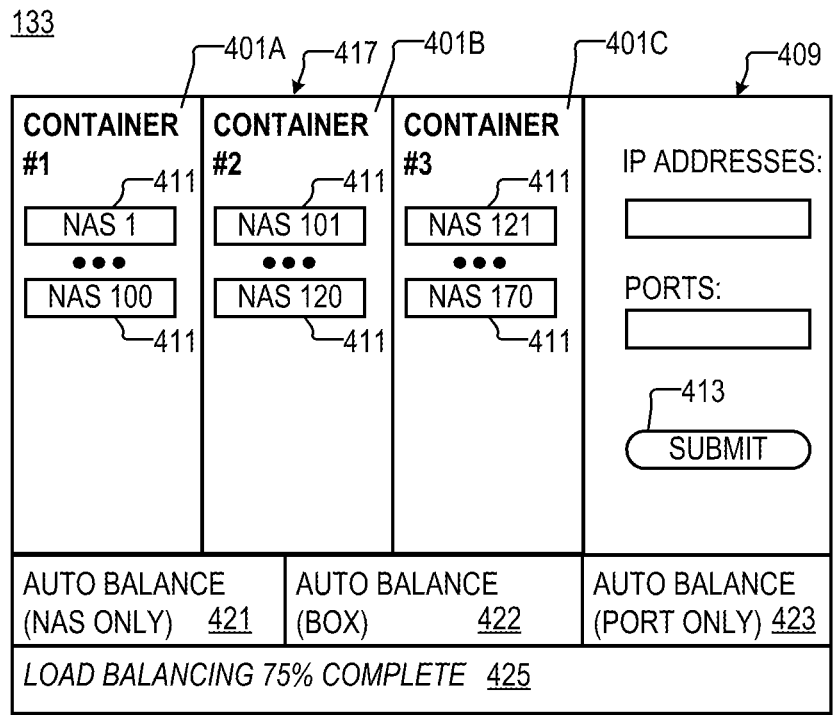
FIG. 4A is a diagram of an example of a user interface, according to aspects of the disclosure.

FIG. 4A shows an example of the GUI 133, according to aspects of the disclosure. As illustrated, the GUI 133 may include a portion 409, a portion 417, an input component 421, an input component 422, an input component 423, and a progress field 425.

Portion 409 may include a menu for selecting one of the storage processors 112A-C in the storage array 110. Portion 409 may include one or more input components for identifying the NAS facilities whose representations are desired to be displayed in portion 417 of the GUI 133. Specifically, portion 409 may include: (i) a first text input field for inputting the Internet Protocol (IP) addresses (e.g., comma-separated) of the storage processors 112 whose NAS facilities and/or master containers are desired to be presented in portion 417 of GUI 133, and (ii) a second text input field for inputting the port numbers (e.g., comma-separated) of the NAS facilities whose representations are desired to be displayed in portion 417 of GUI 133. After the IP addresses and port numbers are input into the text input fields by the user, the user may press the submit button 413. After the submit button 413 is pressed, the backend 135 may parse the contents of the first and second text input fields, generate a respective representation for each (or at least some) of the NAS facilities (and/or master containers) that are executed by the storage processors whose IP addresses are provided, and display the generated representation in portion 409. Although in the example of FIG. 4A text input fields are used to identify one or more storage processors, it will be understood that the present disclosure is not limited to any specific type of input component or set of input components being used. Furthermore, in some implementations, the storage processor(s) may be identified in a command shell rather than GUI 133. Although in the example of FIG. 4A portions 409 and 417 are displayed in the same user interface screen, alternative implementations are possible in which portion 409 and portion 417 are displayed in different user interface screens.

Portion 417 may include a menu for different master containers 202A-C in a storage processor 112 and/or different NAS facilities 206 that are executed within each of master containers 202A-C. Specifically, portion 417 may include a representation 401A of the master container 202A in one of the storage processors 112A-C that is selected in portion 409 (i.e., the storage processor 112A in the present example). In addition, portion 417 may include a representation 401B of the master container 202B in the storage processor that is selected in portion 409, and a representation 401C of the master container 202C in the storage processor that is selected in portion 409.

Representation 401A may include a different respective representation 411 of each of the NAS facilities 206 in the master container 202A. Representation 401B may include a different respective representation 411 of each of the NAS facilities 206 in the master container 202B. Representation 401C may include a different respective representation 411 of each of the NAS facilities 206 in the master container 202C. Each of the representations 411 may be associated with a particular NAS facility 206 (e.g., by virtue of metadata that is associated with the representation). Each of the representations 411 may be provided for the purposes of selecting or visualizing its associated NAS facility 206. Each of the representations 411 may include a static image or text, or an interactive component such as a menu, text link, a button, a checkbox, a radio button, etc.

Each of input components 421-423 may be associated with a different load-balancing action. Activating (e.g., pressing, selecting, clicking, etc.) any of the input components 421-423 may cause the backend 135 to perform the input component's corresponding load-balancing action. According to the present example, each of the input components 421-423 is a button. However, alternative implementations are possible in which any of the input components 421-423 is another type of input component, such as a checkbox, a radio button, a text link, and/or any other suitable type of input component. Progress field 425 may include any suitable type of user interface component that is configured to present an indication of the remaining time for completing a particular load-balancing action.

The GUI 133 is provided as an example only. It will be understood that the GUI 133 is not limited to displaying the information that is shown in FIG. 2. For example, in some implementations, each of the representations 401 may be configured to provide an indication of the resource consumption of the master container 202 that is represented by this representation 401. The indication of resource consumption may identify one or more of the CPU time consumption of the master container 202, the memory consumption of the master container 202, the network bandwidth consumption of the master container 202, the number of I/O requests (per unit time) that are executed by the NAS facilities in the master container 202 and/or any other suitable type of resource consumption metric. As another example, in some implementations, each of the representations 411 may be configured to provide an indication of the resource consumption of the NAS facility 206 that is represented by the representation 411. The indication of resource consumption may identify one or more of the CPU time consumption of the NAS facility 206, the memory consumption of the NAS facility 206, the network bandwidth consumption of NAS facility 206, the number of I/O requests (per unit time) that are executed by the NAS facility 206, and/or any other suitable type of resource consumption metric.

For simplicity, the examples provided with respect to FIGS. 4A-10 use the count of NAS facilities 206 that are executed on a particular master container 202 as a measure of the load that is being placed on that master container 202. However, it will be understood that the present disclosure is not limited to using any specific metric for measuring the load that is being placed on a particular master container. For example, in some implementations, the load on a master container 202 may be measured by the CPU time consumption of the master container 202 and/or its constituent NAS facilities, memory consumption of the master container 202 and/or its constituent NAS facilities, count of I/O requests (per unit time) that are being executed by the NAS facilities 206 in the master container 202, etc.

Figure 4B:
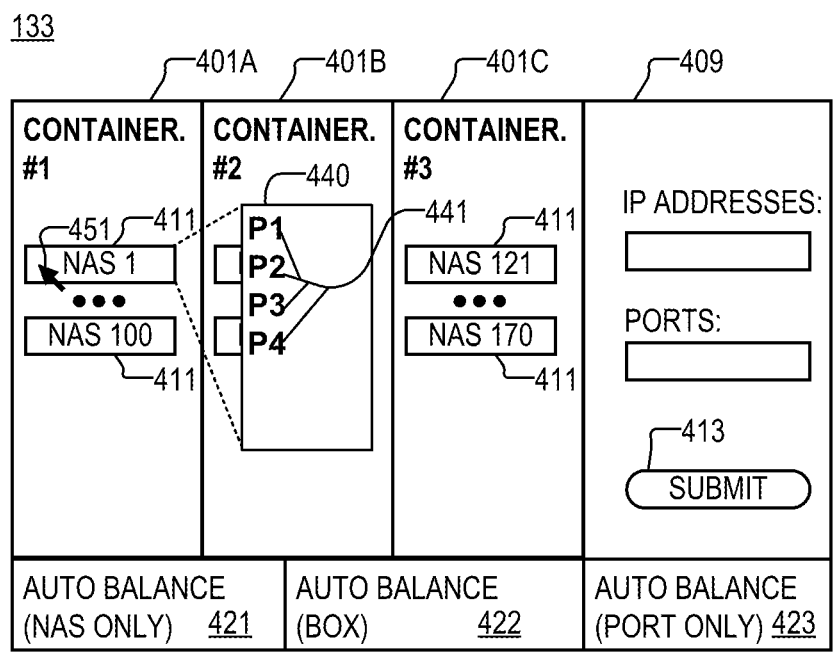
FIG. 4B is a diagram of an example of a user interface, according to aspects of the disclosure.

FIG. 4B shows an example of using the GUI 133 for the assignment of a port to a particular NAS facility 206. In the example of FIG. 4B, the user places the mouse cursor 451 on the representation 411 of a given one of the NAS facilities 206 that is executed in the master container 202A of storage processor 112A. Next, the user presses the right mouse button. Next, in response to the right-click, the backend 135 detects that the given NAS facility 206 has been selected. Next, the backend 135 causes the GUI 133 to display a menu 440. The menu 440 may include a plurality of elements 441. Each of the elements 441 corresponds to a different one of the ports P1-P4 of the storage processor 112A. Next, the user selects one of the elements 441 of the menu 440. Next, the backend 135 identifies the port that is associated with the selected element 441. And finally, the backend 135 maps the identified port to the given NAS facility 206 (i.e., the NAS facility that is selected by the right-click). In some implementations, mapping the identified port to the given NAS facility 206 may cause the given NAS facility 206 to begin using the identified port for the purposes of reading, writing, moving, deleting and/or otherwise manipulating data in the storage devices 114. Additionally, in some implementations, before being mapped to a new port, the given NAS facility 206 may be unmapped from a port that is currently being used by the given NAS facility 206. In some implementations, the port maps may be maintained in the SDNAS layer 204. Additionally or alternatively, in some implementations, the mapping and unmapping of ports may be performed by the SDNAS layer 204 and/or SDNAS instance that is part of the master container executing the given NAS facility.

Figure 5A:
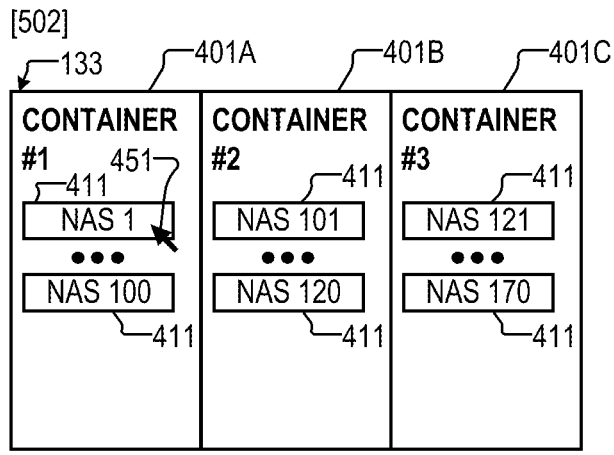
FIG. 5A is a diagram of an example of a user interface, according to aspects of the disclosure.
Figure 5B:
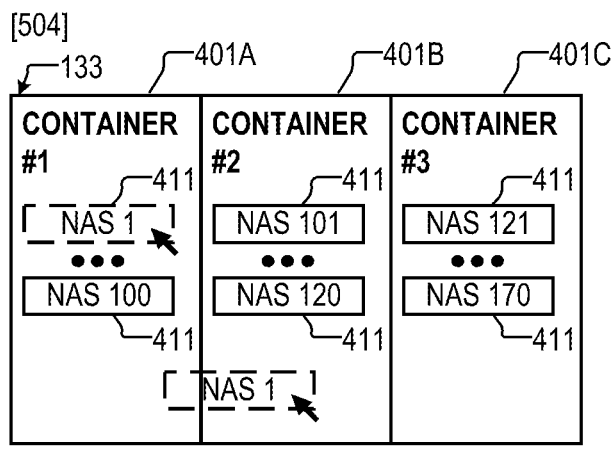
FIG. 5B is a diagram of an example of a user interface, according to aspects of the disclosure.
Figure 5C:
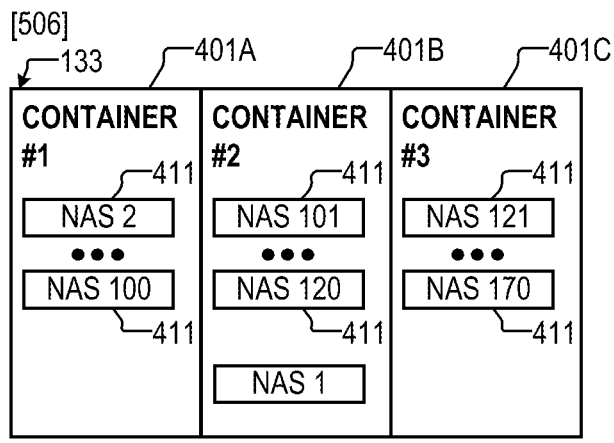
FIG. 5C is a diagram of an example of a user interface, according to aspects of the disclosure.

FIGS. 5A-C show an example of using the GUI 133 for relocating a NAS facility 206 from one master container to another master container. At stage 502, the user places the mouse cursor 451 over the representation 411 of a given one of the NAS facilities 206 (hereinafter "NAS 1"). At stage 504, the user drag-and-drops the representation 411 of NAS 1 from representation 401A of master container 202A to representation 401B of master container 402B. At stage 506, the backend 135 detects that the representation 411 of NAS 1 has been dragged-and-dropped from representation 401A to representation 401B. In response to detecting the drag-and-drop input, the backend 135 relocates NAS 1 from master container 202A (hereinafter "source container") to master container 202B (hereinafter "destination container"). Relocating NAS 1 may include unmapping NAS 1 from the master container 202A and mapping NAS 1 to the master container 202B. The mapping/unmapping may be performed by calling an API method that is provided by the SDNAS layer 204. The SDNAS may be perform the mapping/unmapping internally and provide a status update/acknowledgment.

Although in the example of FIGS. 5A-C the source and destination containers are executed on the same storage processor, alternative implementations are possible in which the source and destination containers are executed on different storage processors. In this regard, it will be understood that alternative implementations are possible in which the GUI 133 displays, at the same time, representations of master containers 202 that are executed on different storage processors 112A-C.

Figure 6A:
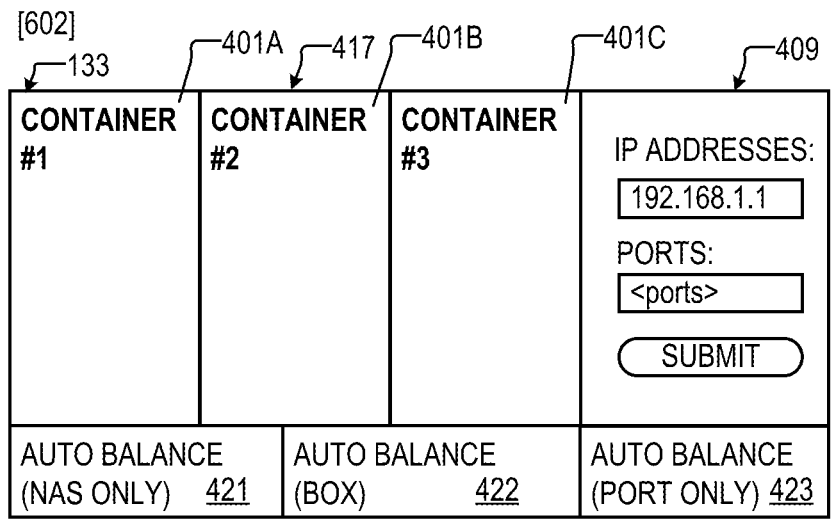
FIG. 6A is a diagram of an example of a user interface, according to aspects of the disclosure.
Figure 6B:
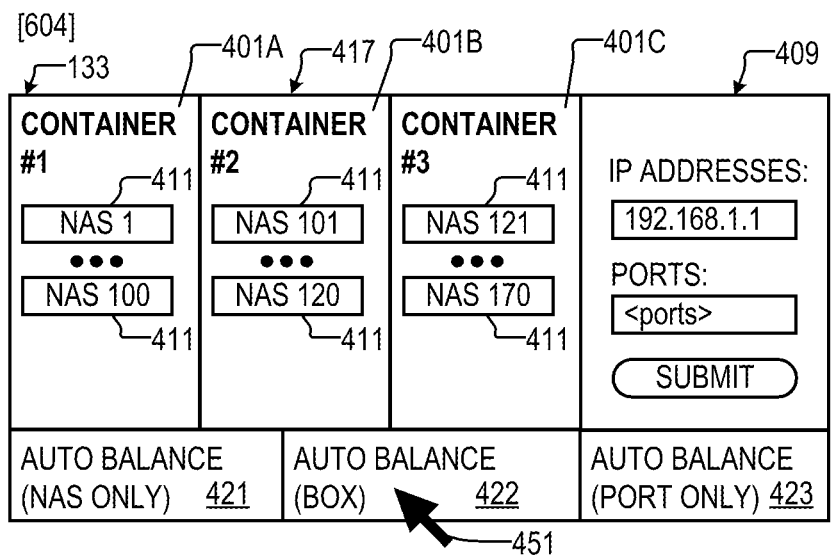
FIG. 6B is a diagram of an example of a user interface, according to aspects of the disclosure.
Figure 6C:
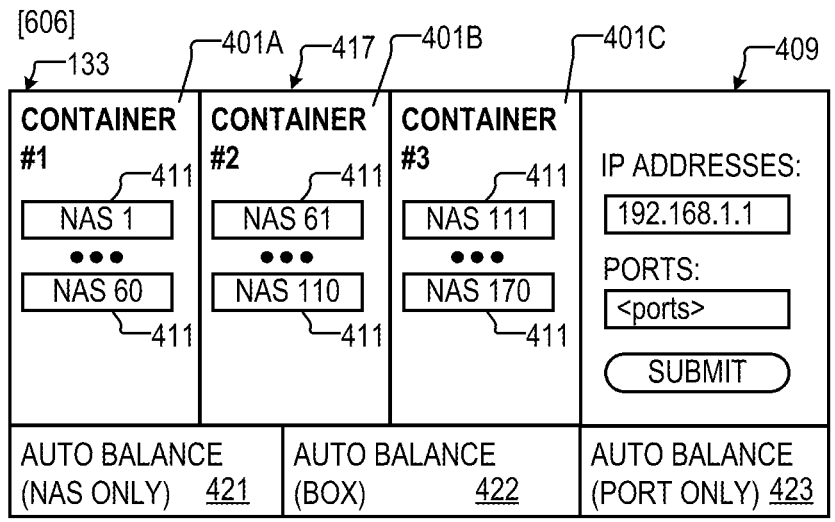
FIG. 6C is a diagram of an example of a user interface, according to aspects of the disclosure.

FIGS. 6A-C show an example of using the GUI 133 for auto-balancing one of the storage processors 112A-C, according to aspects of the disclosure. At stage 602, the user inputs, into portion 409, the IP address and/or other information of the storage processor 112 whose master containers the user would like to balance. In the present example, the user inputs the IP address and/or other identifying information of the storage processor 112A. In response to the user input, the backend 135 displays, in portion 417, representations 401 of the master containers and/or NAS facilities that are executed on the storage processor identified in portion 409 of GUI 133. Specifically, in representation 401A, the backend 135 displays representations 411 of the NAS facilities 206 that are executed in the master container 202A; in representation 401B, the backend 135 displays representations 411 of the NAS facilities 206 that are executed in the master container 202B; and in representation 401C, the backend 135 displays representations 411 of the NAS facilities 206 that are executed in the master container 202C.

At stage 604, the user selects the input component 422. According to the present example, the selection is performed by pressing the input component 422.

At stage 606, in response to the selection, the backend 135 auto-balances the storage processor that is selected at stage 602. According to the present example, load-balancing the storage processor includes: (i) balancing the load on the master containers that are executed on the storage processor, and (ii) balancing the load on the ports of the storage processor. According to the present example, the load on master containers 202A-C of storage processor 112A is balanced, and the load on ports P1-P4 of the storage processor 112A is balanced, as well.

In some implementations, the load on the master containers 202 may be balanced by executing the following steps: (i) identify one of the master containers in the storage processor 112A that has the highest load (hereinafter "source master container"), (ii) identify another one of the master containers in the storage processor that has the lowest load (hereinafter "destination master container"), (iii) select one of the NAS facilities that are executed on the source master container, (iv) relocate the selected NAS facility to the destination master container, (v) detect whether the load on the master containers in the NAS facility 206 is substantially even, (vi) if the load is substantially even, stop, and (vii) otherwise, if the load is not substantially even, return to step 'i'. According to the present example, the load on a master container is measured in terms of the count of NAS facilities that are executed on the master container. In this regard, identifying the load on a master container may include identifying a count of NAS facilities that are being executed in the master container. According to the present example, the load on a plurality of master containers is substantially even if none of the plurality of master containers is executing more than a predetermined number of NAS facilities than any other one of the plurality of master containers. For example, the load on a plurality of NAS facilities may be substantially even if the number of NAS facilities that are executed on any of the master containers is within 1-5 NAS facilities of the number of NAS facilities that are executed on each of the other NAS facilities in the plurality.

Stated succinctly, balancing the load on a set of master containers may include relocating at least one NAS facility from a source master container in the set to a destination master container in the set. When a NAS facility is relocated from the source master container to the destination master container, the NAS facility stops using services provided by the source master container and begins using services provided by the second master container to perform the services. Such services may include NIS, LDAP, FTP, SFTP, NFS, and/or DNS services.

Although, in the present example, the source and destination master container are executed on the same storage processors, alternative implementations are possible in which the source and destination master containers are executed on different storage processors. In other words, the concepts and ideas presented throughout the disclosure may be used to balance the load on master containers across a plurality of storage processors.

In some implementations, the load on the ports P1-P4 may be balanced by executing the following steps: (i) identify one of the ports P1-P4 in the storage processor 112A that has the highest load (hereinafter "source port"), (ii) identify another one of the ports P1-P4 in the storage processor that has the lowest load (hereinafter "destination port"), (iii) select one of the NAS facilities that are assigned to the source port, (iv) unmap the selected NAS facility from the source port and map the selected NAS facility to the destination port, (v) detect whether the load on the ports P1-P4 is substantially even, (vi) if the load is substantially even, stop, and (vii) otherwise, if the load is not substantially even, return to step 'i'. According to the present example, the load on a port is measured in terms of the count of NAS facilities that are mapped to the port. In this regard, identifying the load on a master container may include identifying a count of NAS facilities that are mapped to the port. According to the present example, the load on the ports P1-P4 is substantially even if none of the ports P1-P4 is assigned to more than a predetermined number of NAS facilities than any other one of the ports P1-P4. For example, the load on ports P1-P4 may be substantially even if the number of NAS facilities that are assigned to any of ports P1-P4 is within 1-5 NAS facilities of the number of NAS facilities that are assigned to any other one of the ports P1-P4.

Figure 7A:
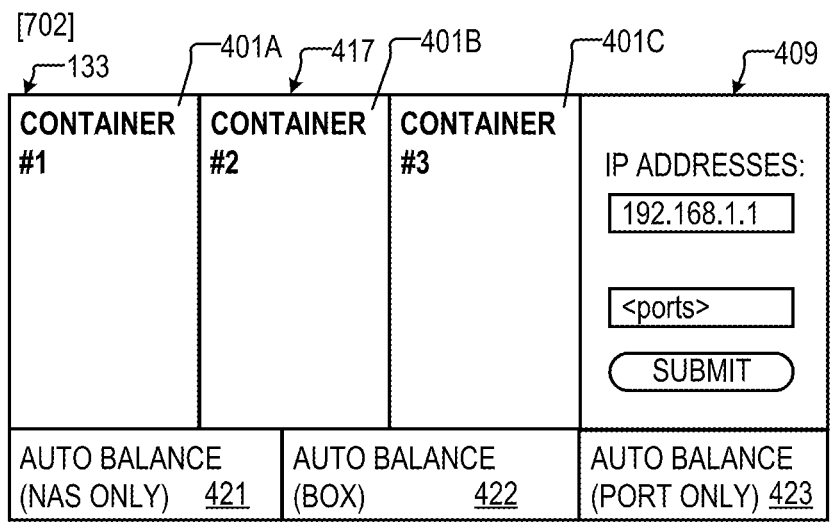
FIG. 7A is a diagram of an example of a user interface, according to aspects of the disclosure.
Figure 7B:
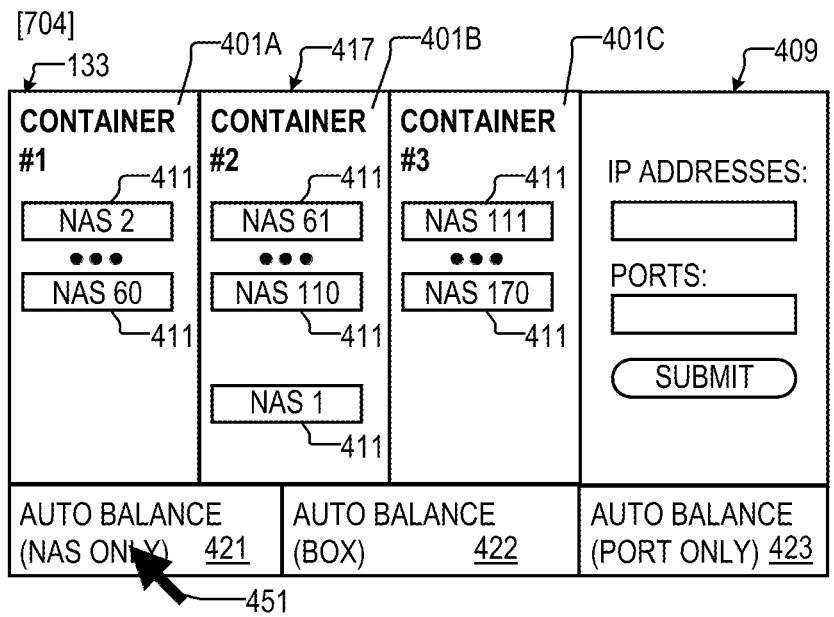
FIG. 7B is a diagram of an example of a user interface, according to aspects of the disclosure.
Figure 7C:
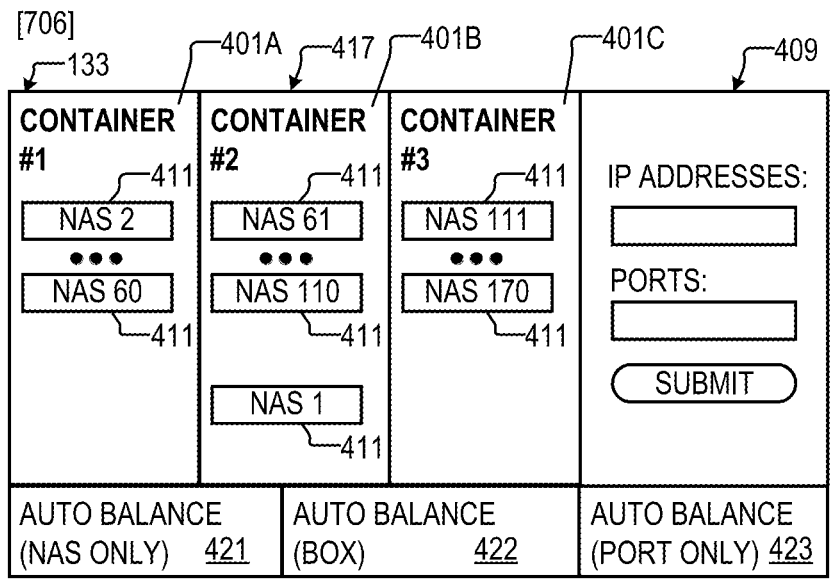
FIG. 7C is a diagram of an example of a user interface, according to aspects of the disclosure.

FIGS. 7A-C show an example of using the GUI 133 for auto-balancing one of the storage processors 112A-C, according to aspects of the disclosure. At stage 702, the user inputs, into portion 409, the IP address and/or other information of the storage processor 112 whose master containers the user would like to balance. In the present example, the user inputs the IP address and/or other identifying information of the storage processor 112A. In response to the user input, the backend 135 displays, in portion 417, representations 401 of the master containers and/or NAS facilities that are executed on the storage processor identified in portion 409 of GUI 133. Specifically, in representation 401A, the backend 135 displays representations 411 of the NAS facilities 206 that are executed in the master container 202A; in representation 401B, the backend 135 displays representations 411 of the NAS facilities 206 that are executed in the master container 202B; and in representation 401C, the backend 135 displays representations 411 of the NAS facilities 206 that are executed in the master container 202C. At stage 704, the user selects the input component 421. According to the present example, the selection is performed by pressing the input component 421. At stage 706, in response to the selection, the backend 135 performs NAS-only auto-balancing of the storage processor that is selected at stage 702. According to the present example, the NAS-only load-balancing includes balancing the load on the master containers 202A-C that are executed on the storage processor 112A, without balancing the load on the ports P1-P4 of the storage processor 112A. The balancing of the load on master containers 202A-C may be performed in the manner discussed above with respect to FIGS. 6A-C.

In the example of FIGS. 6A-7C, the user identifiers in portion 409 of GUI 133 one storage processor, and the backend 135 displays, in portion 417 of GUI 133, representations of the master container and NAS facilities that are executed by the identified storage processor. However, alternative implementations are possible in which the user identifies, in portion 409 of GUI 133, a set of two or more storage processors (e.g., by using comma-separated formatting, etc.). When multiple storage processors 112 are selected in portion 409 of GUI 133, the backend 135 may display, in portion 417 of GUI 133, representations of the NAS facilities and master containers that are executed by each of the storage processors in the specified set of storage processors. When multiple storage processors are specified by the user, selecting one of input components 422 and 421 may cause the load on any of the master containers that are executed by one of the storage processors in the set to become substantially even with the load on any of the master containers that are executed by another one of the storage processors in the set. In some implementations, when the load of the master containers that are executed by the storage processors in the set is balanced, a NAS facility may be relocated from a master container that is executed by one of the storage processors in the set to another master container that is executed on another one of the storage processors 112 in the set.

Figure 8A:
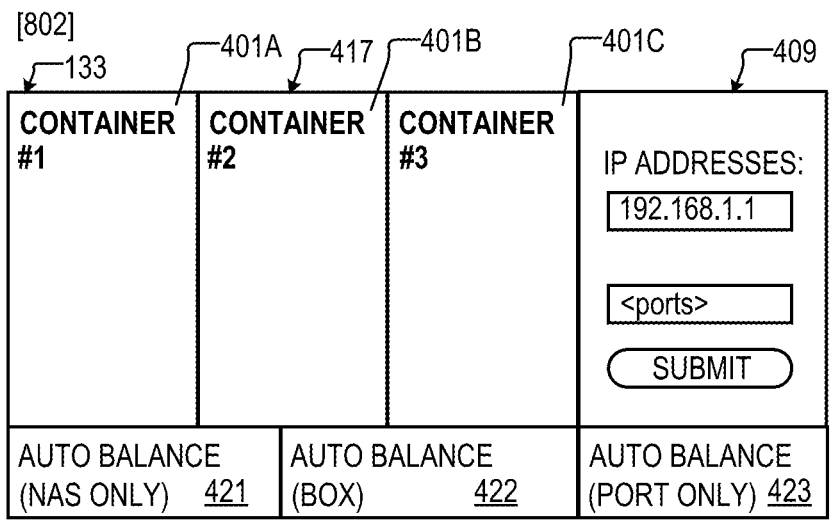
FIG. 8A is a diagram of an example of a user interface, according to aspects of the disclosure.
Figure 8B:
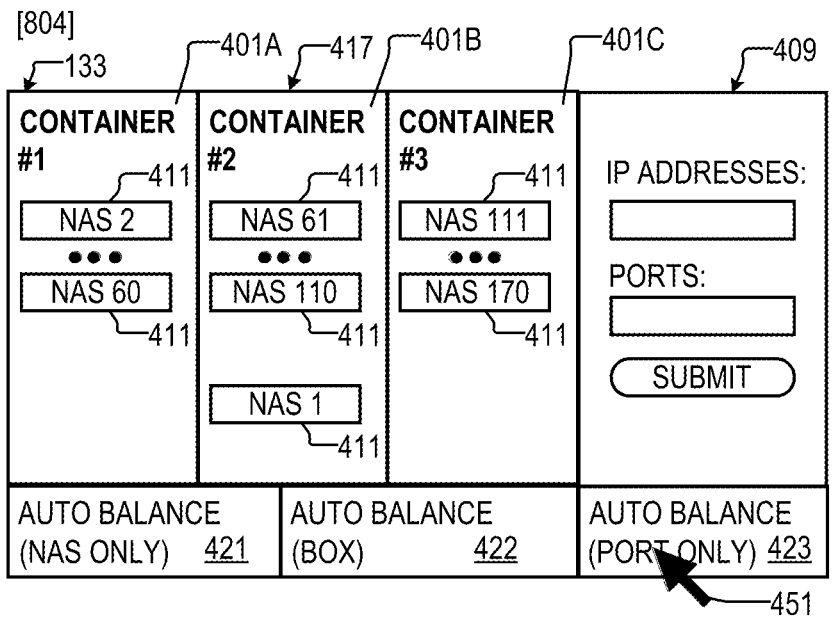
FIG. 8B is a diagram of an example of a user interface, according to aspects of the disclosure.
Figure 8C:
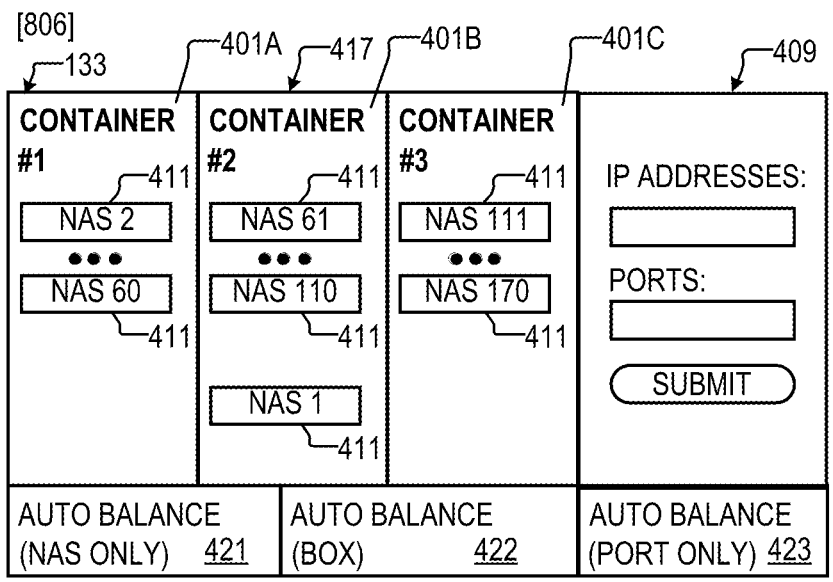
FIG. 8C is a diagram of an example of a user interface, according to aspects of the disclosure.

FIGS. 8A-C show an example of using the GUI 133 for auto-balancing one of the storage processors 112A-C, according to aspects of the disclosure. At stage 802, the user inputs, into portion 409, the IP address and/or other information of the storage processor 112 whose master containers the user would like to balance. In the present example, the user inputs the IP address and/or other identifying information of the storage processor 112A. In response to the user input, the backend 135 displays, in portion 417, representations 401 of the master containers and/or NAS facilities that are executed on the storage processor identified in portion 409 of GUI 133. Specifically, in representation 401A, the backend 135 displays representations 411 of the NAS facilities 206 that are executed in the master container 202A; in representation 401B, the backend 135 displays representations 411 of the NAS facilities 206 that are executed in the master container 202B; and in representation 401C, the backend 135 displays representations 411 of the NAS facilities 206 that are executed in the master container 202C. At stage 804, the user selects the input component 423. According to the present example, the selection is performed by pressing the input component 423. At stage 806, in response to the selection, the backend 135 performs port-only auto-balancing of the storage processor that is selected at stage 802. According to the present example, the port-only load-balancing includes balancing the load on the ports P1-P4 of the storage processor 112A, without balancing the load on the master containers 202A-C of the storage processor 112A. The balancing of the load on ports P1-P4 of storage processor 112A may be performed in the manner discussed above with respect to FIGS. 6A-C.

Figure 9:
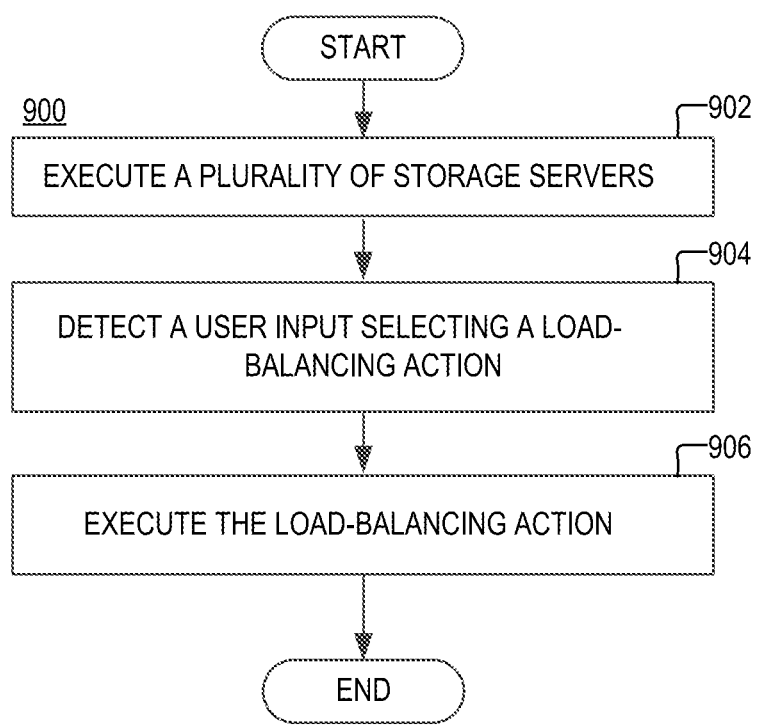
FIG. 9 is a flowchart of an example of a process, according to aspects of the disclosure.

FIG. 9 is a flowchart of an example of a process 900, according to aspects of the disclosure. According to the present example, the process 900 is executed by the load manager 132. However, the present disclosure is not limited to any specific entity executing the process 900. At step 902, a plurality of NAS facilities are executed on a storage array. According to the present example, the plurality of NAS facilities includes the NAS facilities 206, which are discussed above with respect to FIG. 2, and the storage array is storage array 110. At step 904, a user input is detected that selects a load-balancing action. The user input may be the drag- and drop input discussed above with respect to FIGS. 5A-C, and/or any of the user inputs discussed above with respect to FIGS. 4B and 6A-8B. At step 906, the load-balancing action is executed in response to the user input. The load-balancing action may include any of the load-balancing actions that are discussed above with respect to FIGS. 4A-8B.

Figure 10:
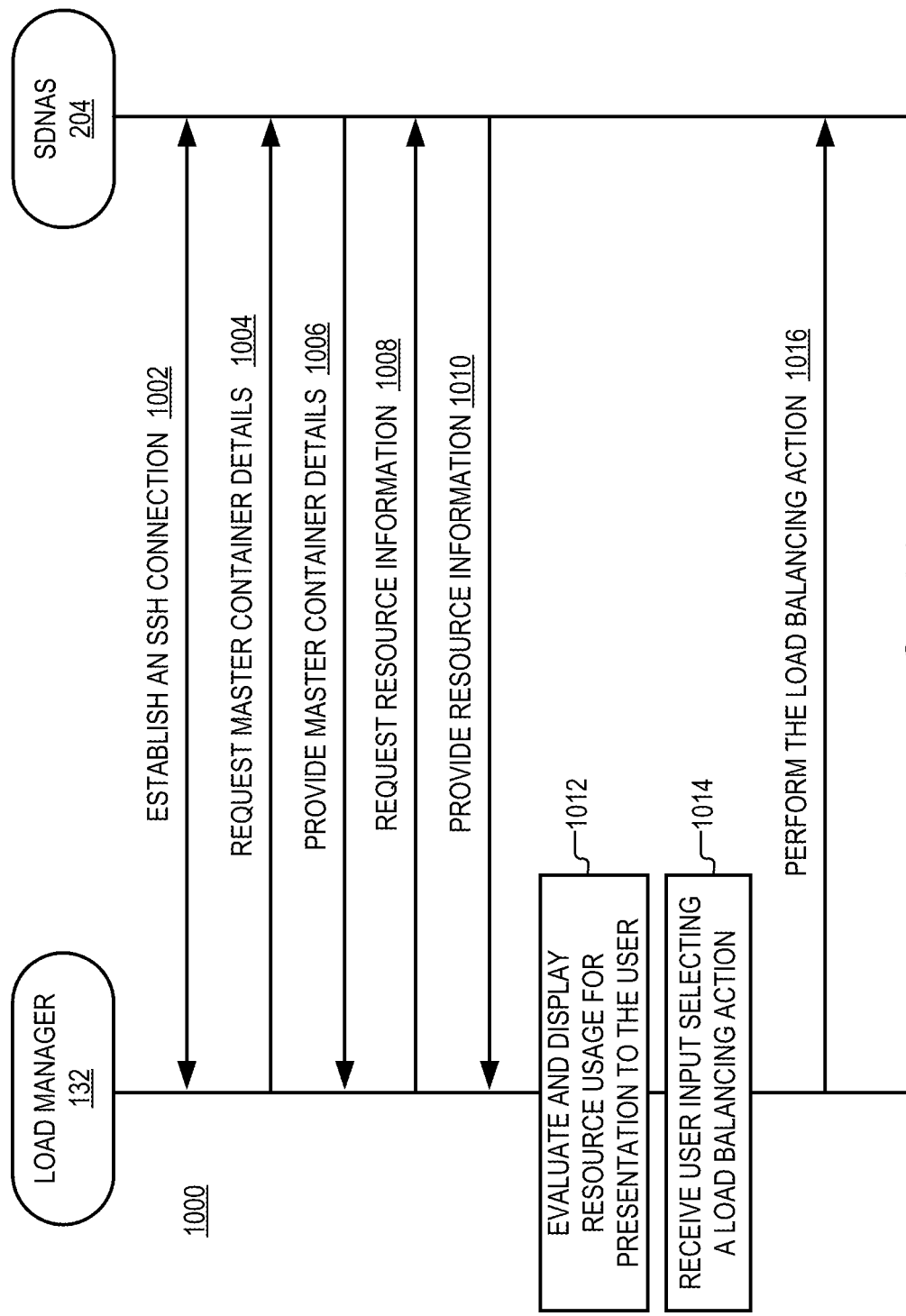
FIG. 10 is a sequence diagram of an example of a process, according to aspects of the disclosure.

FIG. 10 is a sequence diagram of an example of a process 1000, according to aspects of the disclosure. At step 1002, the load manager 132 establishes an SSH connection with the SDNAS layer 204. At step 1004, the load manager 132 requests master container details from the SDNAS layer 204. The request may include one or more of: (1) a request for identifiers of all or some of the master containers 202 that are executed on the SDNAS layer 204 and/or (2) a request for the identifiers of all (or some) of the NAS facilities 206 that are executed inside each of the master containers 202. At step 1006, the SDNAS layer 204 provides, to the load manager 132, the information that is requested at step 1004. At step 1008, the load manager transmits to the NAS facility a request for resource usage information. The request may be include a request for the resource usage (e.g., CPU/memory usage) of all master containers that are executed in the SDNAS layer 204 and/or The request may include one or more of: (i) a request for the CPU time consumption of each (or some) of the master containers 202 in the SDNAS layer 204, (ii) a request for the memory consumption of each (or some) of the master containers 202 in the SDNAS layer 204, (iii) a request for the I/O requests (per unit) that are received (or executed) by each (or some) of the master containers 202 in the SDNAS layer 204, (iv) a request for the I/O requests (per unit time) that are received by each (or some) of the NAS facilities 206 in one or more of the master containers 202. At step 1010, the SDNAS layer 204 provides to the load manager 132 the requested storage information. At step 1012, the information received at steps 1006 and 1010 is displayed by the load manager 132 for presentation to the user. In some implementations, the information may be displayed in the GUI 133. At step 1014, the load manager 132 receives a user input selecting a load-balancing action. At step 1016, the load manager 132 performs the load-balancing action.

According to the present example, performing the load-balancing action by the load manager 132 includes transmitting from the load manager 132 to the SDNAS layer 204 one or more instructions, which when executed by the SDNAS layer 204, would cause the SDNAS layer 204 to complete the load-balancing action. For example, to relocate a NAS facility from one master container to another, the load manager 132 may transmit to the SDNAS layer 204 a request to: (i) unmap the NAS facility from the first master container, and (ii) map the NAS facility in the other master container. In instances in which the load-balancing action involves the relocation of multiple NAS facilities, the load manager 132 may generate and transmit multiple map/unmap instructions to the SDNAS layer 204. In other words, in some implementations, for each NAS facility that is being re-located, the load manger may select the NAS facility, select a destination master container for the NAS facility, and generate and transmit (to SDNAS layer 204) map/unmap instruction(s), which when executed by the SDNAS layer 204, would cause the SDNAS layer 204 to relocate the selected NAS facility to the selected destination master container.

As another example, to change the load on one of the ports P1-P4 of a master container, the load manager 132 may transmit to the SDNAS layer: (i) a request to unmap the port from a NAS facility, and (ii) a request to map the NAS facility to another port. In instances in which the load-balancing action involves multiple port reassignments, the load manager 132 may generate and transmit multiple map/unmap instructions to the SDNAS layer 204. In other words, in some implementations, for each port re-assignment, the load manger 132 may select a NAS facility, select a new port for the NAS facility, transmit to the SDNAS layer 204 an instruction to: (i) unmap the NAS facility from its current port, and transmit to the SDNAS layer 204, and (ii) map the new port to the NAS facility.

Figure 11:
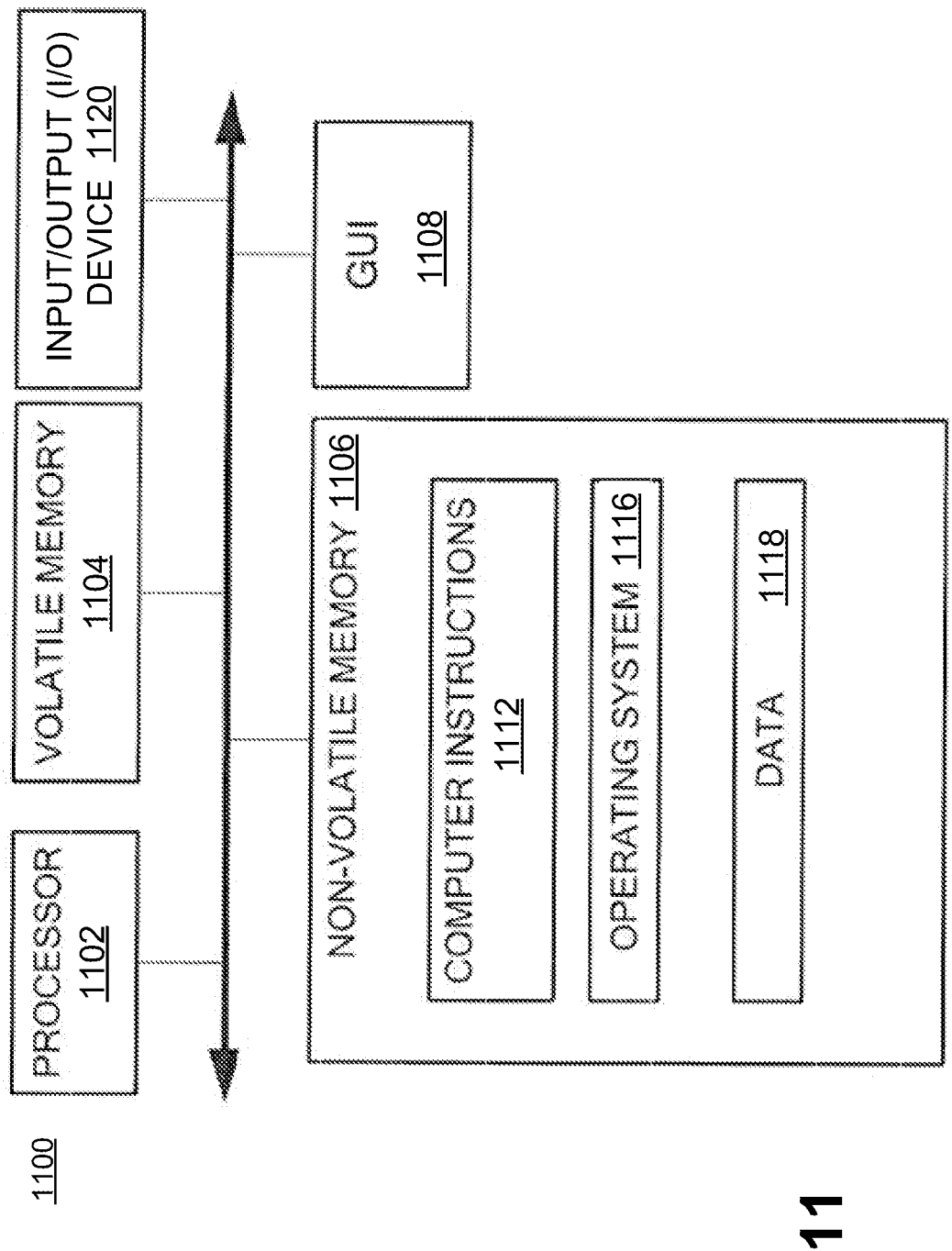
FIG. 11 is a diagram of an example of a computing device, according to aspects of the disclosure.

Referring to FIG. 11, in some embodiments, a computing device 1100 may include processor 1102, volatile memory 1104 (e.g., RAM), non-volatile memory 1106 (e.g., a hard disk drive, a solid-state drive such as a flash drive, a hybrid magnetic and solid-state drive, etc.), graphical user interface (GUI) 1108 (e.g., a touchscreen, a display, and so forth) and input/output (I/O) device 1120 (e.g., a mouse, a keyboard, etc.). Non-volatile memory 1106 stores computer instructions 1112, an operating system 1116 and data 1118 such that, for example, the computer instructions 1112 are executed by the processor 1102 out of volatile memory 1104. Program code may be applied to data entered using an input device of GUI 1108 or received from I/O device 1120.

FIGS. 1-11 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-11 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In some implementations each master container in a storage processor may be assigned a different set of ports P1-P4. In such implementations, the respective ports P1-P4 of each master container may be balanced independently of the ports that are allocated to the other master containers in the same storage processor (e.g., when one of input components 421 or 423 is activated). The balancing of ports may be performed in the manner discussed above with respect to FIGS. 6A-C.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, the method comprising:

executing a plurality of NAS facilities, each of the NAS facilities being implemented as a separate containerized application, each of the NAS facilities being executed inside a respective one of a plurality of master containers, each of the NAS facilities executing a respective one of a plurality of file systems, each of the NAS facilities being configured to read and write data to one or more physical storage locations;

displaying a user interface including a first input component, a first representation of a first master container, and a second representation of a second master container, wherein the first representation of the first master container includes a plurality of first NAS facility representations, each of the first NAS facility representations corresponding to a different respective NAS facility that is executed in the first master container, and wherein the second representation of the second master container includes a plurality of second NAS facility representations, each of the second NAS facility representations corresponding to a different respective NAS facility that is executed in the second master container;

performing a load balancing action in response to input that is received at the user interface, the load balancing action including relocating a first NAS facility from the first master container to the second master container; and detecting that the first input component is activated, and, in response to the first input component being activated, automatically balancing a count of NAS facilities that are assigned to each of a plurality of ports by selecting a first one of the plurality of ports, unmapping a second NAS facility from the first port, selecting a second one of the plurality of ports, and mapping the second NAS facility to the second port.

2. The method of claim 1, wherein relocating the first NAS facility from the first master container to the second master container includes unmapping the first NAS facility from the first master container and mapping the first NAS facility to the second master container.

3. The method of claim 1, wherein the user interface further includes a second input component, and the load balancing action is performed automatically in response to the second input component being activated.

4. The method of claim 1, further comprising:
identifying a resource consumption of each of the plurality of NAS facilities; and
displaying an indication of the resource consumption of each of the plurality of NAS facilities.

5. The method of claim 1, wherein the first master container and the second master container are executed on different storage processors.

6. A system, comprising:
a memory; and
processing circuitry operatively coupled to the memory, the processing circuitry being configured to perform the operations of:
executing a plurality of NAS facilities, each of the NAS facilities being implemented as a separate containerized application, each of the NAS facilities being executed inside a respective one of a plurality of master containers, each of the NAS facilities executing a respective one of a plurality of file systems, each of the NAS facilities being configured to read and write data to one or more physical storage locations;
displaying a user interface including a first input component, a first representation of a first master container, and a second representation of a second master container, wherein the first representation of the first master container includes a plurality of first NAS facility representations, each of the first NAS facility representations corresponding to a different respective NAS facility that is executed in the first master container, and wherein the second representation of the second master container includes a plurality of second NAS facility representations, each of the second NAS facility representations corresponding to a different respective NAS facility that is executed in the second master container;
performing a load balancing action in response to input that is received at the user interface, the load balancing action including relocating a first NAS facility from the first master container to the second master container; and
detecting that the first input component is activated, and, in response to the first input component being activated, automatically balancing a count of NAS facilities that are assigned to each of a plurality of ports by selecting a first one of the plurality of ports, unmapping a second NAS facility from the first port, selecting a second one of the plurality of ports, and mapping the second NAS facility to the second port.

7. The system of claim 6, wherein relocating the first NAS facility from the first master container to the second master container includes unmapping the first NAS facility from the first master container and mapping the first NAS facility to the second master container.

8. The system of claim 6, wherein the user interface further includes a second input component, and the processing circuitry is configured to perform the load balancing action automatically in response to the second input component being activated.

9. The system of claim 6, wherein the processing circuitry is further configured to perform the operations of:
identifying a resource consumption of each of the plurality of NAS facilities; and
displaying an indication of the resource consumption of each of the plurality of NAS facilities.

10. The system of claim 6, wherein the first master container and the second master container are executed on different storage processors.

11. A non-transitory computer-readable medium storing one or more processor-executable instructions, which, when executed by a processing circuitry, cause the processing circuitry to perform the operations of:
executing a plurality of NAS facilities, each of the NAS facilities being implemented as a separate containerized application, each of the NAS facilities being executed inside a respective one of a plurality of master containers, each of the NAS facilities executing a respective one of a plurality of file systems, each of the NAS facilities being configured to read and write data to one or more physical storage locations;
displaying a user interface including a first input component, a first representation of a first master container, and a second representation of a second master container, wherein the first representation of the first master container includes a plurality of first NAS facility representations, each of the first NAS facility representations corresponding to a different respective NAS facility that is executed in the first master container, and wherein the second representation of the second master container includes a plurality of second NAS facility representations, each of the second NAS facility representations corresponding to a different respective NAS facility that is executed in the second master container;
performing a load balancing action in response to input that is received at the user interface, the load balancing action including relocating a first NAS facility from the first master container to the second master container; and
detecting that the first input component is activated, and, in response to the first input component being activated, automatically balancing a count of NAS facilities that are assigned to each of a plurality of ports by selecting a first one of the plurality of ports, unmapping a second NAS facility from the first port, selecting a second one of the plurality of ports, and mapping the second NAS facility to the second port.

12. The non-transitory computer-readable medium of claim 11, wherein relocating the first NAS facility from the first master container to the second master container includes unmapping the first NAS facility from the first master container and mapping the first NAS facility to the second master container.

13. The non-transitory computer-readable medium of claim 11, wherein the user interface further includes a second input component, and the load balancing action is performed automatically in response to the second input component being activated.

14. The non-transitory computer-readable medium of claim 11, wherein the processor-executable instructions, when executed by the processing circuitry, further cause the processing circuitry to perform the operations of:
  identifying a resource consumption of each of the plurality of NAS facilities; and
  displaying an indication of the resource consumption of each of the plurality of NAS facilities.

\* \* \* \* \*